P. HAMMER.
TROLLEY POLE.
APPLICATION FILED JAN. 13, 1917.
1,266,460.
Patented May 14, 1918
2 SHEETS—SHEET 2.
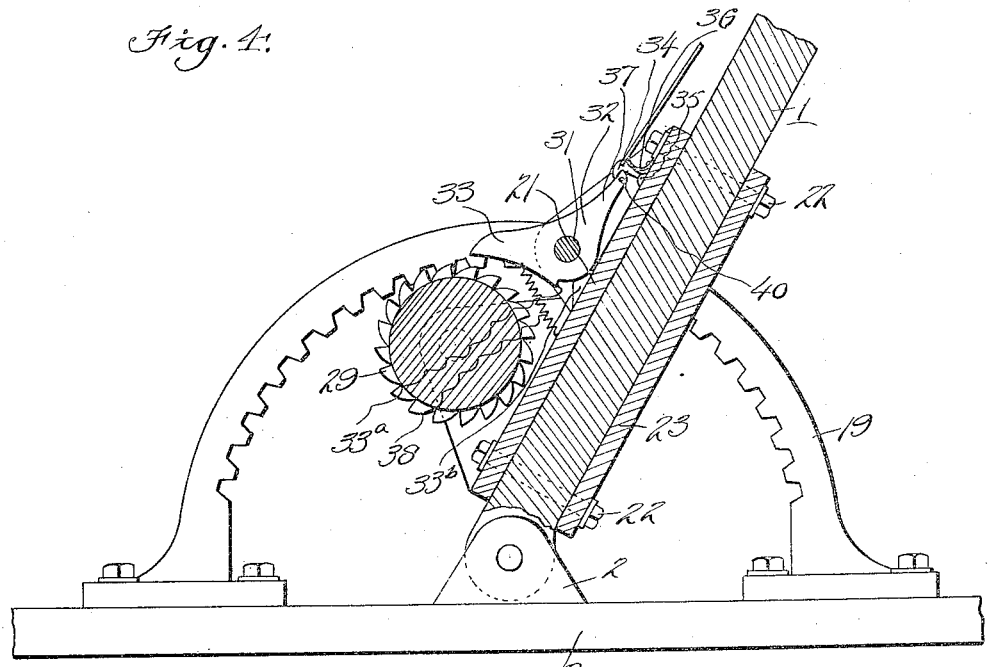
Fig. 4.
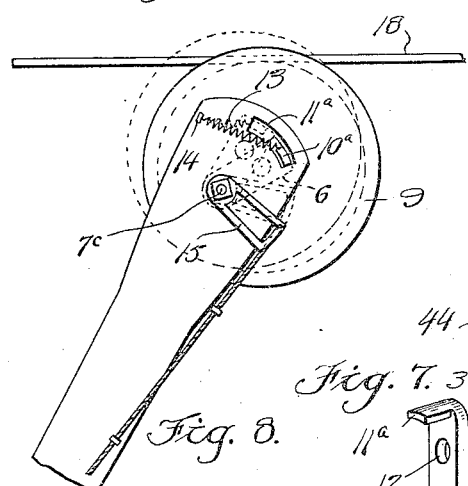
Fig. 5.
Fig. 6.
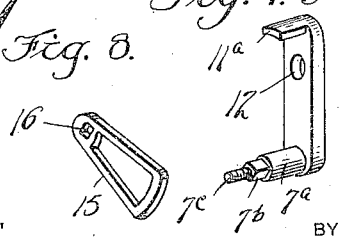
Fig. 8. Fig. 7. Fig. 9.
INVENTOR
Peder Hammer.
WITNESSES
BY
ATTORNEY

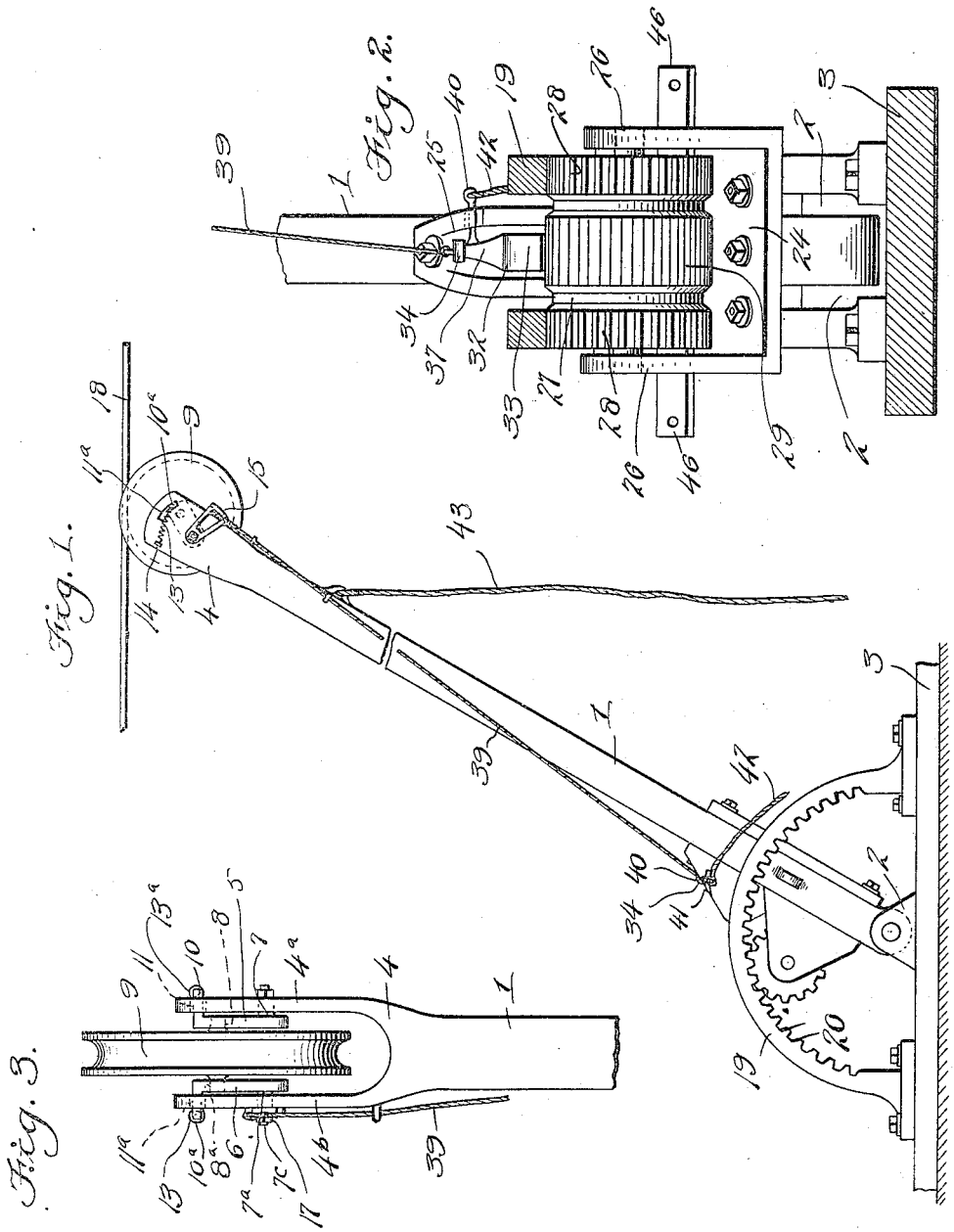

UNITED STATES PATENT OFFICE.

PEDER HAMMER, OF CHICAGO, ILLINOIS.

TROLLEY-POLE.

1,266,460.  Specification of Letters Patent.  Patented May 14, 1918.

Application filed January 13, 1917. Serial No. 142,268.

*To all whom it may concern:*

Be it known that I, PEDER HAMMER, a citizen of Norway, residing at Chicago, in the county of Cook and State of Illinois, have invented certain new and useful Improvements in Trolley-Poles, of which the following is a specification.

This invention relates to trolley poles, and more particularly to a trolley pole provided with means for locking the pole against upward movement in the event of the trolley wheel running off of or jumping the trolley wire.

One of the main objects of the invention is to provide means whereby a trolley pole of standard construction can be provided with means for preventing upward movement of the pole when the wheel jumps the trolley, such means being quickly and easily applied to the pole. A further object is to provide a trolley wheel which is rockably mounted in the pole and is so connected to the means for locking the pole against movement that, a very slight movement of the wheel in a forward direction is sufficient to lock the pole thus preventing it from rising to any appreciable extent so as to damage the trolley or guy wires in the event of the trolley wheel leaving the trolley wire. A further object is to provide a resilient mounting for the trolley wheel supplemental to the mounting of the pole and independent therefrom which serves to maintain the wheel in proper engagement with the trolley wire thus insuring proper contact of the wheel and wire surfaces and eliminating to a great extent the damage to the wheel through arcing such as occurs where a good contact between these elements is not obtained. Further objects will appear from the detail description.

In the drawings:—

Figure 1 is a side view of a trolley pole and the locking means therefor constructed in accordance with my invention, Fig. 2 is a front view of the same, the upper portion of the pole and the trolley wheel being omitted, Fig. 3 is a detail back view of the trolley wheel and its mountings, Fig. 4 is a side view of the locking means for a pole partly in section, Fig. 5 is a detail side view of the trolley wheel and the mounting therefor, Fig. 6 is a detail perspective view of the supporting plate for the lock control means, Fig. 7 is a detail perspective view of one of the trolley wheel supporting plates, Fig. 8 is a detail perspective view of the lock tripping arm, Fig. 9 is a perspective view of the mounting of the trolley pole.

The trolley pole 1, which is of standard construction, is pivotally mounted at its lower end between the upwardly extending spaced lugs 2 formed integral with the base plate 3 which is adapted to be secured to the car roof. The pole is provided at its upper end with a fork 4. A trolley wheel supporting plate 5 is mounted on one arm $4^a$ of fork 4, and a similar plate 6 is mounted on the other arm $4^b$ of the fork. Plate 5 is provided adjacent its lower end with an integral outwardly extending stud 7 which extends through an aperture of arm $4^a$. This plate is further provided, above stud 7, with an aperture which receives an outwardly extending stub 8 formed integral with the grooved trolley wheel 9 at the center of one side thereof. Plate 5 is further provided, at its upper end, with an integral outwardly extending finger 10 which projects through an arcuate slot 11 formed in arm $4^a$ of the fork, this slot being curved on an arc struck from the center of the stud 7. Plate 6 is provided with a stud $7^a$ similar to stud 7 and a finger $10^a$ similar to finger 10 which projects through a slot 11 formed in arm $4^b$ of the fork. This plate is also provided with an aperture 12 which receives the stub $8^a$ formed at the center of wheel 9 is axial alinement with stub 8. The studs 7 and $7^a$ are also mounted in axial alinement, the trolley wheel 9 thus being mounted for free rotation in the plates 5 and 6, and the plates being mounted on a common axis so as to have movement in a forward or backward direction in the fork 4 of the trolley pole 1. A tension spring 13 is secured at its outer end to a lug 14 formed integral with the arm $4^b$ of the fork in front of the slot $11^a$, and at its inner end to the finger $10^a$ of trolley wheel supporting plate 6. A similar spring $13^a$ is similarly mounted and secured to the finger 11 of plate 5. These two springs act to rock the plates 5 and 6, and consequently the trolley wheel 9, forward and upward about the pivotal axis of the plates, this forward movement of the wheel being positively limited by the wall at the forward ends of the slots 11 and 11ª, the backward movement of the arm being positively limited by the walls at the back or rearward ends of the slots.

The stub 7ª of plate 6 is of such length as to extend through the arm 4ᵇ of fork 4 so as to be flush with the outer face thereof. This stub is squared adjacent its outer end to provide an integral nut like member 7ᵇ, being reduced and threaded beyond this member to provide a screw stem 7ᶜ for securing the plate in the arm of the fork. A tripping arm 15 is provided, adjacent its inner end with a squared aperture 16 which fits snugly over the nut 7ᵇ of stub 7ª, this arm being secured in position by the nut 17 threaded on to the screw stem 7ᶜ. By this means, when the plate 6 is rocked about its pivotal axis, the arm 15 will also be rocked. When the pole 1 is raised, by means to be later described, so as to force the trolley wheel 9 against the trolley wire 18, the wheel 9, and consequently the plates 5 and 6, are forced backward and downward into the position shown in Figs. 1 and 5 of the drawings so as to bring the fingers 10 and 10ª of the plates against the walls at the back ends of the slots 11 and 11ª. With the trolley wheel in this position the springs 13 and 13ª are under tension and tend to rock the trolley wheel forward and upward. These springs act in this manner, during the normal operation of the trolley pole, to hold the wheel 9 in close engagement with the trolley wire 18 thus insuring proper contact between the wheel and wire and preventing to a large extent injurious arcing. When the trolley wheel is in normal position, the tripping arm 15 is inclined slightly downward and rearward, as shown.

Adjacent each side of the trolley pole 1, and concentric with the pivotal axis thereof, an approximately semicircular rack 19 is secured to plate 3. Each of these racks is provided with inwardly directed teeth 20. A supporting plate 21 is secured on the pole 1 adjacent the lower end thereof by means of bolts 22 passed through the same and the pole, and a plate 23 mounted at the back of the pole. The plate 21 is provided with a rectangular body portion 24 and a restricted neck 25. A standard 26 is provided at each side of the body portion 24. These two standards rotatably support a cylinder 27 which is provided at each end with an integral spur-pinion 28, a ratchet wheel 29 being provided intermediate the pinions and formed integral therewith. The pinions 28 mesh with the racks 19, and the teeth of ratchet 29 are directed rearwardly relatively to the direction of travel of the car in conrection with which the trolley mechanism is used. The neck 25 of supporting plate 21 is provided, at each side, with an upwardly extending tab or ear 30. These ears are provided with alined openings in which is rockably mounted a shaft 31 on which is secured a pawl 32, the pawl being thus rockably supported between the two ears. The lower arm 33 of this pawl is shaped to engage the teeth of ratchet 29 so as to prevent rearward rotation of the same, when the pawl is depressed. A spring pressed catch 34 is rockably mounted between two lugs 35 on the neck 25 of plate 21. This catch is normally forced downward by a leaf spring 36 secured on the neck 25 and in engagement with the catch, the outer end or head of the catch being shaped to engage over the upper end of the upper arm 37 of pawl 32. By this means, the pawl is normally held in raised or inoperative position against action of the tension spring 38 which is secured to the lower arm 33 of the pawl and the plate 21 in advance of the pivotal axis of the pawl. With the pawl raised in this position, the trolley pole 1 is free to move or oscillate about its pivotal axis so as to accommodate variations in the height at which the trolley wire 18 is suspended, in the usual manner. This oscillation of the trolley pole will move the spur-pinions 28 around the racks 19 so as to cause rotation of the pinions and the ratchet wheel 29 the direction of rotation depending upon the direction of movement of the trolley pole. When the trolley pole moves in an upward or forward direction, the pinions 28 and consequently the ratchet-wheel 29, will be rotated rearwardly and downwardly. Obviously, if the pawl 32 is lowered so as to bring the arm 33 thereof into engagement with the teeth of ratchet wheel 29 rearward rotation of the ratchet wheel, and consequently the pinions 28, will be prevented thus locking the pole 1 against forward and upward movement. A cable 39 is secured at its upper end to the outer end of trip arm 15, and at its lower end to the head of catch 34, this cable being passed through suitable eyes or the like secured on the pole. This cable is of such length that, when the trolley wheel 9 leaves the wire 18 and is rocked forward in the manner previously described, very slight upward movement of tripping arm 15 will be sufficient to raise the catch 34 so as to release arm 37 of the pole 32 thus locking the pole against forward movement. As will be noted, the tripping arm is relatively long, and the trolley wheel is moved through an arc of comparatively short radius, the radius of movement of the trolley wheel being exceedingly small relatively to the radius of movement of the trolley pole. For this reason, when the trolley wheel leaves the trolley wire the pole will be locked against forward and upward movement almost instantaneously, any appreciable upward movement of the pole being thus positively prevented. By this means, all damage to the trolley wires and guys which would result from the pole being moved into a substantially vertical position so as to extend a considerable distance above the trolley wire is eliminated. To insure accuracy of engagement of arm 33 of pawl 32 with the teeth of ratchet wheel 29, a shoulder 33ª is provided at the base of arm 33 and is adapted to engage with a stub or lug 33ᵇ formed integral with the supporting plate 21.

To permit the trolley pole 1 to be released from the locking means, arm 37 of pawl 33 is provided with an integral laterally extending finger 40. This finger projects through an arcuate slot 41 through one of the ears 30 of neck 25 of the supporting plate. A suitable cord 42 is secured to the outer end of this finger and may be placed in any position in which it is easily accessible by the conductor of the car. By means of this cord, the pawl 32 may be returned to its normal or inoperative position so as to permit the trolley pole 1 to be manipulated by means of the usual cable 43 so as to return the trolley wheel 9 into its operative position in contact with trolley wire 18. When the pawl is in normal position, the trolley wheel 9 will be returned to its rearward or operative position thus lowering the tripping arm 15 so as to permit the catch 34 to engage over the upper end of arm 37 of the pole, after which the tension on cable 42 is released.

A T standard 44 is secured at the front end of plate 3 in advance of the racks 19. A tension spring 45 is secured at its forward end to the head of standard 44, adjacent each end thereof. The inner end of each tension spring is secured to a laterally extending arm 46 carried by the pole 1 adjacent supporting plates 21. These arms extend through the racks and the springs 45 are positioned outside of the racks, thus preventing interference between the means for holding the trolley pole in raised position and the means for locking the trolley pole against movement when the trolley wheel 9 leaves the trolley wire 18.

A trolley control apparatus construction in accordance with my invention is well adapted to be used in connection with a trolley pole of standard construction, no changes being required in the pole with the exception of the provision of the arcuate slots 11 and 11ª to accommodate the fingers 10 and 10ª of the trolley supporting plates. The pinions and ratchet wheel, as well as the pole and catch for holding it in inoperative position are all carried by the supporting plate 21, this plate being adapted to be quickly and easily secured to the lower end portion of a trolley pole of standard construction by the simple expedient of passing bolts through the plate and the pole. In addition, as above pointed out, the arc of movement of the trolley wheel is of such small radius compared to the arc of movement of the trolley pole that the pole is locked against movement practically instantaneously with the trolley wheel leaving the trolley wire thus preventing any appreciable upward movement of the pole and the resulting damage to the trolley wire and supports therefor. In addition, the means for throwing the locking means for the pole into operation also serves the function of providing a cushion mounting for the trolley wheel so as to at all times hold it in close contact with the trolley wire.

What I claim is:—

1. In trolley pole control means, a trolley pole pivotally mounted at its lower end, arcuate racks positioned at each side of said pole concentric therewith, a ratchet drum rotatably mounted on said pole and provided at each end with a pinion, the pinions meshing with said racks, a pawl mounted on the pole for engagement with said ratchet drum so as to prevent upward movement of the pole about its axis, means for normally holding said pawl out of engagement with the ratchet drum, a trolley wheel mounted in the upper end of the pole for engagement with a trolley wire, and connections between said pawl and wheel for releasing the pawl so as to permit engagement thereof with the ratchet when the trolley wheel leaves the trolley wire.

2. In trolley pole control means, a trolley pole pivotally mounted at its lower end, inwardly directed arcuate racks mounted at each side of the lower end of said pole and disposed concentric with the pivotal axis thereof, a ratchet drum rotatably mounted on the pole and provided adjacent its ends with pinions meshing with said racks, a pawl rockably mounted on the pole for engagement with said ratchet drum, means for normally holding said pawl out of engagement with the drum, a trolley wheel mounted in the upper end of the pole for forward and rearward movement therein, and connections between said trolley wheel and the means for holding the pawl out of engagement with the drum for releasing said pawl when the trolley wheel moves forwardly in the pole.

3. In trolley pole control means, a trolley pole pivotally mounted at its lower end and having a fork at its upper end, plates pivotally mounted on each arm of the fork on a common axis, each plate being provided with an upwardly directed bearing member adjacent its lower end and an outwardly directed finger at its upper end, and each arm of the fork having an arcuate slot to accommodate said finger, a trolley wheel rotatably mounted in said plates above the pivotal axis thereof, tension springs each having one end secured to the finger of each plate and the other end secured to the arm of the fork in advance of said finger, a relatively long trip arm secured to the bearing member of one of said plates so as to turn therewith, two spaced parallel racks mounted adjacent the lower end of said pole concentric with the pivotal axis thereof, a supporting plate detachably secured on the pole adjacent the lower end thereof, two pinions rotatably mounted in said plate and meshing with said racks, a ratchet wheel intermediate said pinion and rigidly secured thereto and having its teeth directed rearwardly and downwardly, a pawl rockably mounted in said plate and adapted to engage said ratchet, a catch carried by the plate and adapted to engage said pawl so as to normally hold the same out of engagement with the ratchet wheel, connections between said catch and trip arm for moving the catch into inoperative position so as to release the pawl when the trolley wheel is rocked forward, and means for normally rocking the trolley pole forward and upward about its pivotal axis.

In testimony whereof I affix my signature in presence of two witnesses.

PEDER HAMMER.

Witnesses:
ELIAS FIRMANN,
GAYHARDT A. ANDERSEN.

Copies of this patent may be obtained for five cents each, by addressing the "Commissioner of Patents, Washington, D. C."